(12) United States Patent
Huster (10) Patent No.: US 9,661,161 B2
(45) Date of Patent: May 23, 2017

(54) ROAMING PRINTING BY ASSIGNING ID INFORMATON OF A USER TO PRINT JOB DATA AND TRANSMITTING THE ASSIGNED ID INFORMATION TO PRINTING DEVICES ON A NETWORK BY MULTI-CASTING

(75) Inventor: Karsten Huster, Lienen (DE)

(73) Assignee: Canon Europa N.V., Amstelveen (NL)

(*) Notice: Subject to any disclaimer, the term of this patent is extended or adjusted under 35 U.S.C. 154(b) by 0 days.

(21) Appl. No.: 13/148,021

(22) PCT Filed: Feb. 9, 2010

(86) PCT No.: PCT/EP2010/000791
§ 371 (c)(1),
(2), (4) Date: Oct. 17, 2011

(87) PCT Pub. No.: WO2010/089153
PCT Pub. Date: Aug. 12, 2010

(65) Prior Publication Data
US 2012/0026537 A1    Feb. 2, 2012

(30) Foreign Application Priority Data
Feb. 9, 2009   (EP) ..................................... 09100105

(51) Int. Cl.
G06F 15/00    (2006.01)
H04N 1/00    (2006.01)
G06F 3/12    (2006.01)

(52) U.S. Cl.
CPC ....... *H04N 1/00278* (2013.01); *G06F 3/1205* (2013.01); *G06F 3/1222* (2013.01); *G06F 3/1238* (2013.01); *G06F 3/1268* (2013.01); *G06F 3/1285* (2013.01); *G06F 3/1271* (2013.01); *H04N 2201/3276* (2013.01)

(58) Field of Classification Search
CPC combination set(s) only.
See application file for complete search history.

(56) References Cited

U.S. PATENT DOCUMENTS

| 8,086,669 B2 | 12/2011 | Huster | 709/203 |
| 2001/0038462 A1* | 11/2001 | Teeuwen et al. | 358/1.15 |
| 2003/0231329 A1* | 12/2003 | Edmonds et al. | 358/1.13 |

(Continued)

FOREIGN PATENT DOCUMENTS

EP    1 229 724    7/2002

OTHER PUBLICATIONS

International Search Report and Written Opinion of the International Searching Authority mailed Jun. 5, 2010, in PCT/EP2010/000791.

(Continued)

*Primary Examiner* — Henok A Shiferaw
(74) *Attorney, Agent, or Firm* — Fitzpatrick, Cella, Harper & Scinto (57) ABSTRACT

A method of printing a document is described. The method comprises a workstation generating and storing print job data for a document, the workstation assigning ID information to the print job data, the user inputting the assigned ID information at a chosen printing device, the printing device transmitting a print job data request signal to the workstation, and the workstation transmitting the print job data to the printing device.

10 Claims, 5 Drawing Sheets

(56) References Cited

U.S. PATENT DOCUMENTS

| | | | |
|---|---|---|---|
| 2005/0052694 A1* | 3/2005 | Asano | G06F 21/31 |
| | | | 358/1.15 |
| 2005/0068564 A1* | 3/2005 | Ferlitsch | 358/1.15 |
| 2005/0141018 A1* | 6/2005 | Oak et al. | 358/1.15 |
| 2005/0195816 A1* | 9/2005 | Sumiyoshi | 370/390 |
| 2006/0274355 A1* | 12/2006 | Ferlitsch | G06F 21/608 |
| | | | 358/1.15 |
| 2007/0058193 A1* | 3/2007 | Wu | H04N 1/00954 |
| | | | 358/1.15 |
| 2007/0146778 A1 | 6/2007 | Kitagata | |
| 2009/0086261 A1 | 4/2009 | Irino | |

OTHER PUBLICATIONS

Summons To Attend Oral Proceedings issued in related EP application 09100105.7 on Nov. 14, 2016.
Examination Report issued on Feb. 20, 2014 in related GB application No. GB1113358.4.

\* cited by examiner

ROAMING PRINTING BY ASSIGNING ID INFORMATON OF A USER TO PRINT JOB DATA AND TRANSMITTING THE ASSIGNED ID INFORMATION TO PRINTING DEVICES ON A NETWORK BY MULTI-CASTING

This application is a National Stage application under 35 U.S.C. §371 of International Application No. PCT/EP2010/000791, filed on Feb. 9, 2010, which claims priority to European Application No. 09100105.7, filed on Feb. 9, 2009, the contents of each of the foregoing applications being incorporated by reference herein.

The present invention relates to the field of roaming printing. Roaming printing is a system of printing that allows a user to print a document from a printer by inputting an instruction to print the document whilst they are away from their workstation. In particular, the user does not have to specify a printer to be used for printing whilst at their workstation. Instead, a user can roam about an office and then select a printer to use, instruct it to print and collect the printed document before returning to their workstation.

BACKGROUND TO THE INVENTION

Prior art roaming printing systems, such as the "follow me" (Ringdale Ltd) system, allow a user to send print job data to a central print server (known as a Q server). When the user wants to print the document, they approach a chosen printer and instruct it to print the job. At this point the chosen printer retrieves the print job data from the Q server. These systems often comprise some kind of identification system, whereby the user logs in to the chosen printer in order to access their print jobs. One such system is described more fully in the Prior Art Example below.

However, a problem with such a system is that it is unsuitable for use in many small business offices with small office installations. These installations often only have a handful of PCs and one or two printers. They do not have a central print server on which to store such print job data or transmit it to the printers.

Accordingly, it is an object of the present invention to provide a method of roaming printing, an office installation, a workstation and a printing device, a computer program product and a computer-readable storage medium capable of roaming printing that are also suitable for use in a small office.

PRIOR ART EXAMPLE

Figure 1:
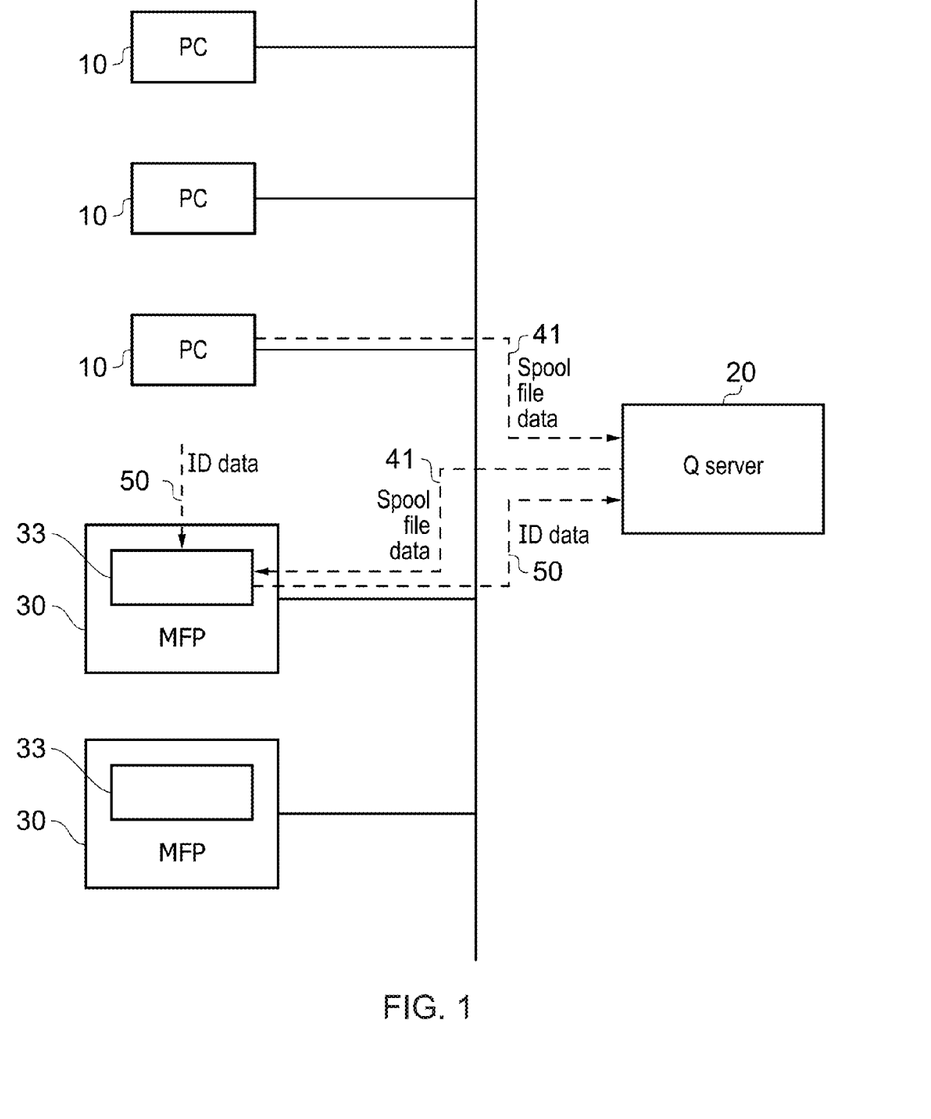
FIG. 1 is a diagram of a prior art office installation capable of roaming printing.

In the prior art "follow me" printing system shown in FIG. 1, the system comprises a number of user PCs 10, a print server (known as a Q server) 20 and a number of printing devices 30, such as Multi-Function Printers (MFPs), conventional printers or copiers. Each PC 10 is connected to the Q server 20 (via a LAN or WAN or the internet) so that spool file data 41 which is generated by a spool (not shown) in each PC can be sent to the Q server. The Q server 20 is also connected to the printing devices 30 so that the spool file data 41 can then be sent to the printing devices 30 and also so that the printing devices 30 can send user identification/recognition data 50 to the Q server 20. Each printing device 30 is provided with a hardware release device 33 for receiving the identification/recognition data 50 from a user.

Figure 2:
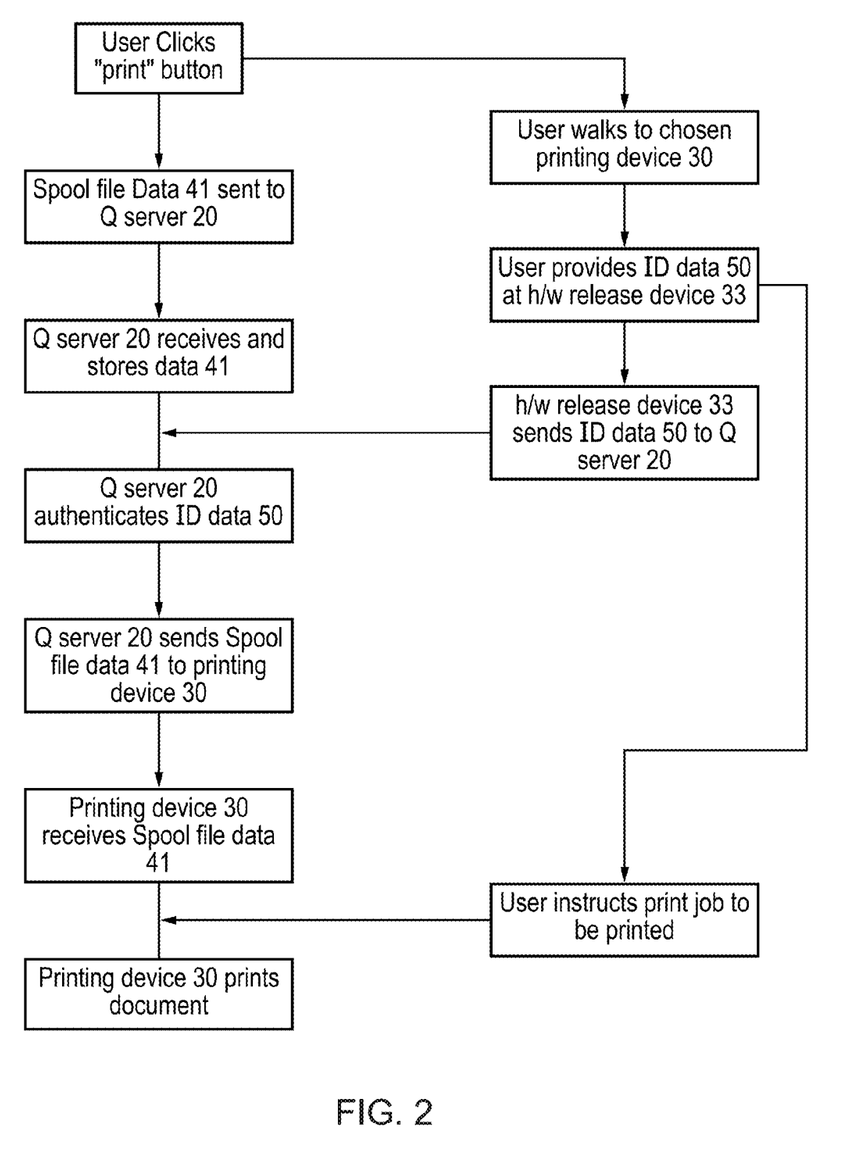
FIG. 2 is a flow chart showing the processes that occur during printing operation of the prior art installation of FIG. 1.

The operational steps that occur when a document is printed are illustrated in FIG. 2. When a user wishes to print a document, they use the normal "print" button (usually through a print dialogue box) on the PC 10. This causes the spool to generate the spool file data 41 and send the spool file data 41 to the Q server 20 via the LAN/WAN network or via the internet. The Q server 20 then stores the spool file data 41. The user can then walk to the printing device 30 they wish to use and identify themselves to the hardware release device 33 (also called an ID Reader hardware or print release station) by inputting identification/recognition data 50 at the printing device 30. The hardware release device 33 then transmits the identification/recognition data 50 to the Q server 20 for authentication. After the identification/recognition data 50 has been authenticated by the Q server, the Q server 20 sends the spool file data 41 to the printing device 30. The user can then instruct the chosen printing device 30 to print the job and the chosen printing device 30 then prints the document.

SUMMARY OF THE INVENTION

According to a first aspect of the invention, there is provided a method of printing a document comprising the following steps: a workstation generating and storing print job data for a document, the workstation assigning ID information to the print job data, the user inputting the assigned ID information at a chosen printing device, the printing device transmitting a print job data request signal to the workstation, and the workstation transmitting the print job data to the printing device.

The method may comprise a step of verifying the inputted ID information against the assigned ID information before the work station transmits the print job data to the printing device.

Preferably, the method further comprises the following steps: the workstation transmitting the assigned ID information to the printing device, the printing device comparing the inputted ID information with the transmitted ID information, and the printing device transmitting an authentication signal to the workstation if the inputted ID information corresponds to the transmitted ID information.

Preferably, the method further comprises the following steps: the workstation transmitting to the printing device a list of pending print jobs for which the inputted ID information is assigned, the printing device receiving the list of pending print jobs from the workstation, the user selecting a number of print jobs from the list, the printing device transmitting a print job data request signal to the workstation based on the print jobs selected, and the workstation transmitting print job data for the selected print jobs to the printing device.

The present invention also provides an office installation capable of roaming printing, the installation comprising: at least one workstation, and at least one printing device, each workstation being connected to each printing device, such that print job data request signals can be transmitted from the printing device(s) to the workstation(s) and print job data can be transmitted from the workstation(s) to the printing device(s), wherein, the installation is arranged such that during a printing operation, (i) one workstation generates and stores print job data and assigns ID information to the print job data, (ii) a user inputs log in data to one printing device, and (iii) the one workstation then transmits the print job data to the one printing device after it has received a print job data request signal from the one printing device.

The present invention further provides a workstation for use as part of an office installation capable of roaming printing, the workstation comprising: a print job data generator for generating print job data for a document to be printed, a print job data store for storing the print job data, an ID information assignor for assigning ID information to the print job data, a signal receiver for receiving a print job data request signal from a printing device in the office installation, and a print job data transmitter for transmitting print job data to the printing device after receiving the print job data request signal.

Preferably, the workstation further comprises an ID information transmitter for transmitting the ID information to the printing device in the office installation.

Preferably, the ID information assignor assigns ID information to the print job data in a form of a user-specified PIN.

Preferably, the ID information assignor assigns ID information to the print job data in a form of a workstation generated job code.

Preferably, the ID information assignor assigns ID information to the print job data in a form of a username and password of the user.

Preferably, the ID information assignor assigns ID information to the print job data in a form of a user-specified card number.

Preferably, the workstation transmits a list of pending print jobs to the printing device upon request.

Preferably, the workstation comprises a print job properties data transmitter to transmit print job properties data to the printing device.

Preferably, the workstation further comprises software for managing the print job data store, wherein upon shutting down of the workstation, the software produces a message indicating that print job data stored in the print job data store will be unavailable when the workstation is turned off.

The present invention still further provides a printing device for use as part of an office installation capable of roaming printing, the printing device comprising: a log in device for a user to input log in data to the printing device, a signal transmitter for transmitting a print job data request signal to a workstation in the office installation, and a print job data receiver for receiving print job data from the workstation.

Preferably, the printing device further comprises: an ID data store for storing ID data received from the workstation, a verifier for verifying a user by comparing the log in data to the ID data.

Preferably, the signal transmitter will only transmit the print job data request signal to the workstation once the user has been verified by the verifier.

Preferably, the printing device compiles a list of pending print jobs based on print job properties data received from the workstation.

Preferably, the printing device can request a list of pending print jobs from the workstation.

Preferably, the printing device verifies the compiled list of pending print jobs against the requested list of pending print jobs.

Preferably, a user can select one or more print jobs from the list, and the signal transmitter will transmit a print job data request signal to the workstation in respect of the print jobs selected.

The present invention also provides a computer program product which when loaded into a workstation and/or a printing device and executed, performs the method described above.

The present invention further provides a computer-readable storage medium which stores the computer program product described above.

BRIEF DESCRIPTION OF DRAWINGS

An embodiment of the invention will now be described, by way of example only, with reference to the following drawings, of which.

Figure 3:
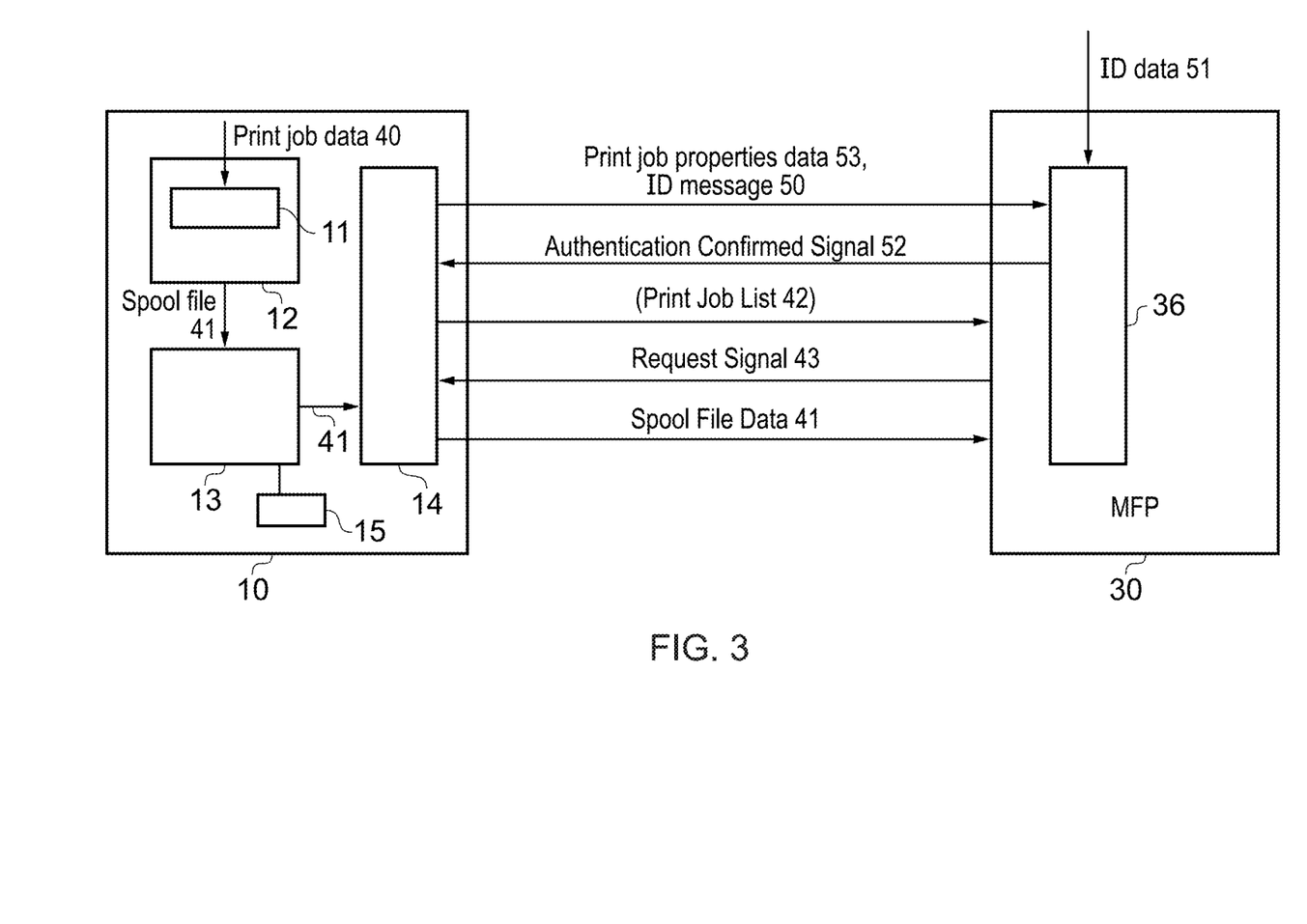
FIG. 3 is a diagram of an office installation capable of roaming printing, according to an embodiment of the present invention.
Figure 5:
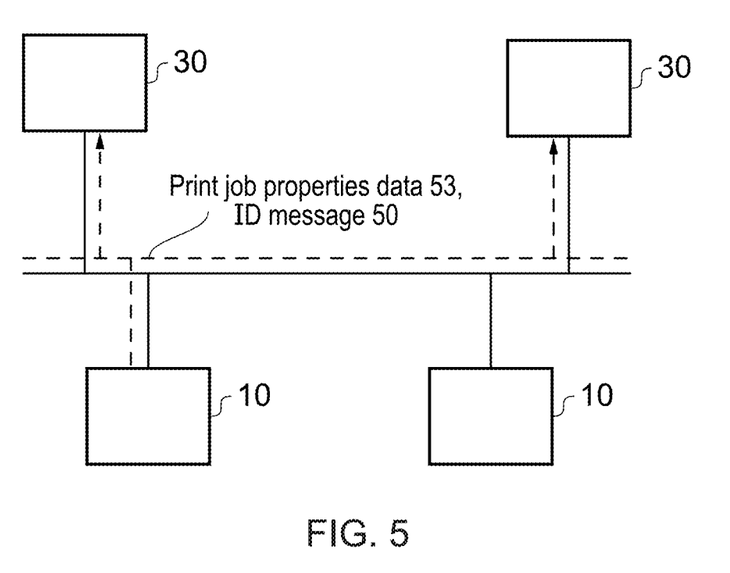
FIG. 5 is a diagram of the office installation of FIG. 3, showing multiple PCs and MFPs.

In an embodiment of the present invention shown in FIG. 3, an office installation comprises one or more PCs 10 and one or more MFPs 30. In the usual use there will be more than one PC 10 and more than one MFP 30; as shown in FIG. 5. For ease of illustration, however, FIG. 3 shows only one PC 10 and one MFP 30.

In the present invention there is no need for a separate Q server. A PC 10 is connected to an MFP 30 through a LAN network.

The PC 10 comprises a standard UFR (ultra fast rendering) printer driver 11 with "roaming" capability. The printer driver 11 can convert print job data 40 into a spool file 41 to be read by a printer. The PC 10 also comprises a printer driver wrapper 12 (also called a port driver) associated with the printer driver 11 and a spool 13 (also called a folder) connected to the wrapper 12. The wrapper 12 allows the printer driver 11 to send the spool file 41 to the spool 13. Printer software 15 is associated with the spool 13 and manages the spool functions. The PC 10 may also comprise further printer drivers that may not have roaming functionality. These may be used by a user to print a document in a conventional/direct way.

The PC 10 also comprises an input/output module 14. This module 14 is connected to the spool 13 and controls the release of the spool file data 41 to the MFP 30 upon receiving an authentication confirmed signal 52 from the MFP 30.

The MFP 30 is provided with a Multifunctional Embedded Application Platform (MEAP) applet 36. The applet 36 allows a user to input identification/recognition data 51. This ID data 51 can be, for example, in the form of a PIN, unique print job code, username and password or a card number from swiping a print user ID card.

Figure 4:
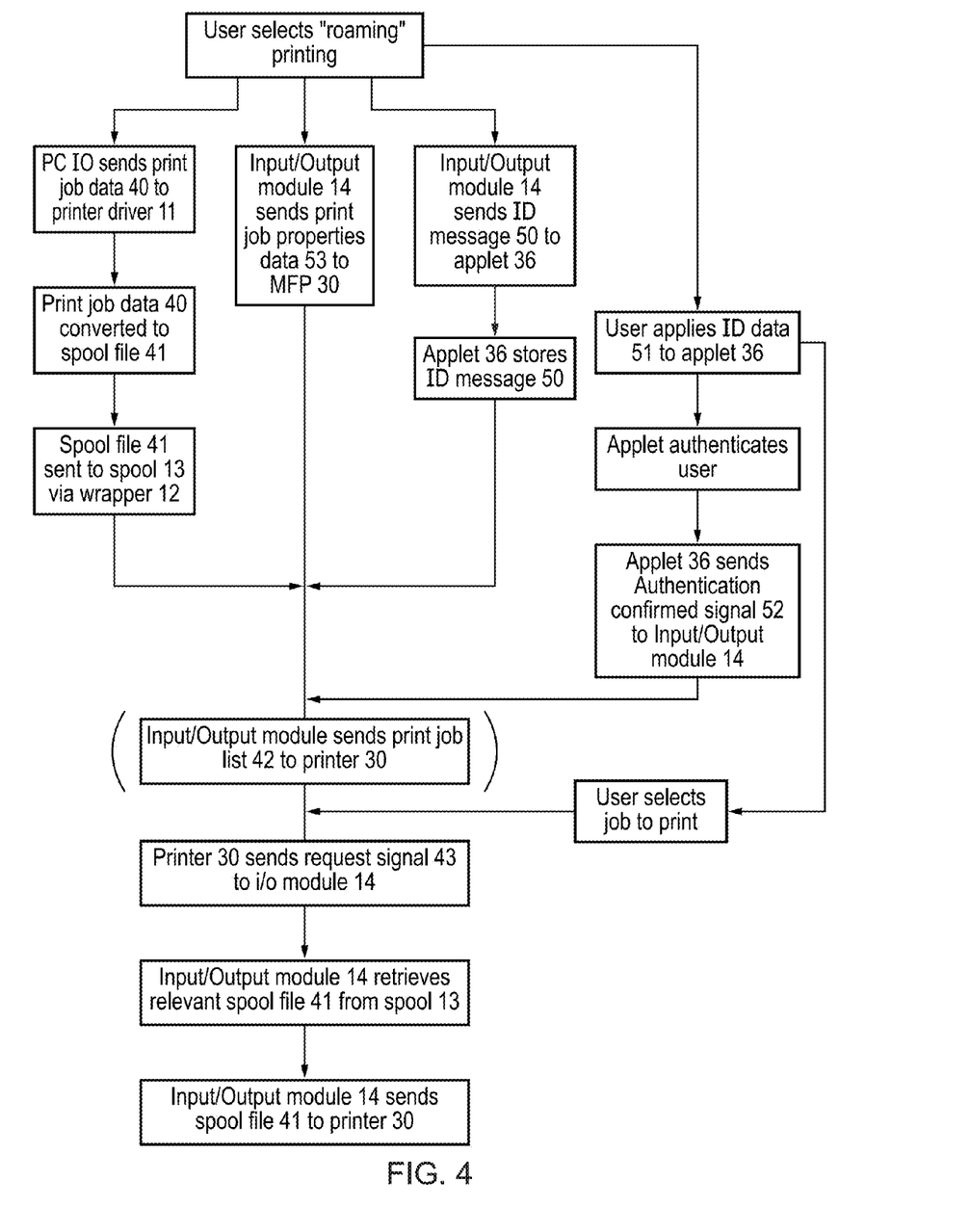
FIG. 4 is a flow chart showing the processes that occur during printing operations of the installation of FIG. 3.

The operational steps that occur when a document is printed are illustrated in FIG. 4.

When the user wishes to print a document, they select to print in a roaming mode. This can be selected by using a roaming printer driver (i.e. a printer driver that can operate solely in a roaming printing system) or by choosing a roaming option in the printer driver (i.e. choosing to operate a printer driver in a roaming mode). As another alternative, a conventional printer driver may be set up to print to a special printer driver wrapper with roaming functionality.

Once the user has instructed the print job to be printed in a roaming mode, three events occur.

First, the PC 10 sends print job data 40 to the printer driver 11. The print job data 40 is then converted into a spool file 41 based on the type of MFP 30 in the office installation. In other words, the spool file 41 stores print job data 40 in a language compatible with each of the MFPs 30 in the installation (for example, PCL5e). The spool file 41 is then sent to the spool 13 via the wrapper 12.

Second, the input/output module 14 multi-casts print job properties data 53 for the print job to the LAN, as shown in FIG. 5. The print job properties data 53 includes the name of the print job, the number of pages of the print job, whether it is in colour or black and white, the number of copies to be printed and the name of the originating PC 10. The applet 36 of each MFP 30 is set to receive the print job properties data 53 and uses the print job properties data 53 to maintain a local registry of all the pending print jobs. The applet 36 is also able to query (not shown in FIG. 3) the PCs 10 for up-to-date print job properties data 53 for print jobs waiting in the spool 13.

Third, the input/output module 14 sends a multi-cast registration message 50 (also known as an ID message) to the LAN, as shown in FIG. 5, for each print job. The applet 36 in each MFP 30 is set to receive the ID message 50.

The ID message 50 can take various forms and depends on how the user has chosen to be identified. For the first print job on a PC 10, once the print job data 40 has been sent to the spool 13, a print screen will show automatically on the PC 10. The print screen gives the user four options for how they wish to be identified. This selects the data contained in the ID message 50:

Option 1—PIN Code;

The user specifies a 4 digit PIN identifier and a 4 digit password for the PIN. If the PIN is the same as one in use for a pending print job and the password does not match that previously specified for the PIN, the user will be asked to specify another PIN and associated password. If the PIN/password combination matches that of a pending print job, the current print job will also be assigned to that PIN. For this option, only the PIN is contained in the ID message 50 and is required by a user to log in at the applet 36. The password is required by the PC 10 only to ensure print jobs allocated to a PIN originate from the same user.

Option 2—Unique Print Job Code;

The PC 10 automatically generates and displays a 4 digit unique print job code. If the user chooses option 2, the unique print job code is allocated to the print job and is contained in the ID message 50. The unique print job code is needed by the user to log in at the applet 36.

Option 3—Username & Password;

If the user chooses option 3, the fact that the username and password option has been chosen is contained in the ID message 50. The MFP applet 36 then requires both a username and password from the user upon log in to the applet 36. The applet 36 then sends the username and password (as were entered to log in at the printing device) to the PC 10. The PC 10 then verifies the username and password sent by the applet 36 against the username and password used to log in at the PC 10. Once the PC 10 has verified the username and password combinations match, the PC 10 will send an authentication confirmed signal 52 signal to the applet 36.

Option 4—Print User ID Card;

If option 4 is chosen, the user specifies a card number that is printed on their allocated print user ID card. The card number is sent in the ID message 50 to the applet 36. In order to log in at the applet 36, the user must present (e.g. swipe) the card to a card reader connected to the applet 36.

Alternatively, the method of identifying the user at the applet 36 can be limited to only one option from the four above being made available to the user.

The user can specify for how long the specified method of identification should be used.

For example, a user can specify that the ID message 50 should be remembered by the PC 10 and applied to every print job originating from that PC 10 and that user for the next 30 minutes, 1 hour, 4 hours etc.

The user may instead specify that the ID message 50 should not be remembered at all. In this case, a user will need to re-choose one of the four options for the subsequent print job. The PC 10 will generate a new unique print job code or re-obtain the username and password or the user will specify a PIN or card number, as appropriate.

The user may instead specify that the ID message 50 should be remembered until the user logs off from the PC 10. In this case, all subsequent print jobs (before the user logs off) will result in the PC 10 sending the same ID message 50 as for the current print job.

Finally, the user may specify that the ID message 50 be remembered forever. This means that even after the user logs off and logs back on again to the PC 10, the same ID message 50 would be used for each print job. Importantly, as the ID message setting is on a per user basis, another user logging on to the PC 10 will not use the previous user's ID message settings.

The PC 10 also provides the option of re-setting the ID message settings. This means a new unique print job code can be generated or a new PIN or new card number can be specified, if the user forgets the existing code or PIN or loses the old print user ID card, for example.

Upon receipt of the ID message 50, the applet 36 at each MFP 30 stores the information.

When a user is ready to print the document, they walk to a chosen one of the MFPs 30 and log in to the applet 36. This is done by supplying ID data 51 sufficient to identify them as the originator of the print job; i.e. the ID data 51 has to match that contained in the ID message 50.

Once the applet 36 has authenticated the user, the applet 36 sends an authentication confirmed signal 52 to the input/output module 14 of the PC 10.

The applet 36 then also produces a list of print jobs 42 for the logged in user based on the print job properties data 53 previously received by it that are relevant to that user and the ID data 51 provided. For example, if the user has allocated the same PIN number to five pending jobs and logs in to the applet 36 using that PIN, print job properties data 53 for those five jobs will appear on the list 42. Data for print jobs originating from the same user but allocated to a different PIN or unique print job code will not appear.

Alternatively, instead of the applet 36 producing a list of print jobs 42 based on print job properties data 53 already received by it, the module 14 of the PC 10 can send a list 42 of the user's relevant print jobs for that PC to the MFP 30 after receiving the authentication confirmed signal 52. This is shown in FIGS. 3 and 4 in brackets.

Of course, it is possible for a particular user to be working from more than one PC 10 over the course of a day. Therefore, the particular user may instruct print jobs from more than one PC 10 to be printed and these print jobs may be pending at the same time. Here, each PC 10 that is an originator of a pending print job allocated to the ID data 51 provided is called an active PC. If there is more than one active PC 10, authentication confirmed signals 52 are sent to each active PC 10. The MFP 30 then receives print job lists 42 from the modules 14 of all the active PCs 10 and then compiles the various lists 42 into a master list containing all the particular user's relevant print jobs from all the active PCs.

As a further alternative, the applet produces the list of a user's print jobs (as above) and also requests the release of the user's relevant print job lists 42 from the modules 14 of the active PCs 10. The applet 36 then uses these lists 42 to verify the list it produced itself.

The user can then select a job from the list 42 for printing. Upon choosing one or more jobs, the MFP 30 sends a request signal 43 to the input/output module 14 and, depending on the print job(s) chosen, the input/output module 14 retrieves the relevant spool file data 41 from the spool 13 and sends it to the MFP 30 for printing.

The user may also choose at the MFP 30 to perform other functions, such as deleting the print job from the list 42 after the print job has been printed. In this case, the request signal 43 will include this additional information. The input/output module 14 will then also instruct the spool 13 to delete the spool file 41 after it has been sent to the module 14. Alternatively, it may be the default position that the print job is deleted from the list 42 upon printing so that this function does not have to be chosen each time. Alternatively, the user may decide that a certain print job on the list 42 is now unwanted. In this case, the request signal 43 will instruct the input/output module 14 to instruct the spool 13 to simply delete the relevant spool file 41 without sending it to the module 14.

The user may also choose at the MFP 30 to request additional or alternative printing or finishing commands for a job, such as stapling, hole punching or double/single sided printing. In this case, the required information is input at the MFP 30 and the MFP 30 prints the print job and finishes it in the required manner.

If the user switches off the PC 10 and there are still spool files 41 in the spool 13 that have not been printed, the printer software 15 provides a message to the user indicating that any pending print jobs will not be available for printing while the PC 10 is switched off. The pending print jobs are saved and will be available again once the PC 10 is switched back on. There may also be an option or default position that pending print jobs will not be available again once the PC 10 is switched back on if they are older than a certain time, for example, 24 hours. In this case, any spool files 41 in the spool 13 corresponding to pending print jobs that are more than 24 hours old are deleted from the spool 13 once the PC 10 is switched back on.

Although this example has shown MFP printing devices, they could be equally conventional printing or copier machines.

Although this example has shown a plurality of printing/copier machines and a plurality of PCs, this example could be equally applied to an office installation with only one PC and/or only one printing or copier machine.

The invention claimed is:

1. A method of printing a document in a system comprising a workstation and a printing device communicating with the workstation via a network, the method comprising the following steps:
   a user selecting, via a printer driver in the workstation, a roaming print mode for printing a document to an unspecified printer in the system;
   the workstation generating and storing print job data for the document;
   the workstation assigning ID information of a user to the print job data;
   the workstation transmitting the assigned ID information to the printing device by multi-casting the assigned ID information to the network;
   the printing device receiving the multi-cast assigned ID information and storing the received assigned ID information;
   the printing device receiving ID information input by a user at the printing device; the printing device comparing the stored assigned ID information with the ID information input by the user;
   the printing device transmitting an authentication signal to the workstation if the input ID information corresponds to the stored assigned ID information based on the comparison;
   the workstation transmitting to the printing device a list of pending print jobs for which the input ID information is assigned after receiving the authentication signal from the printing device;
   the printing device receiving the list of pending print jobs from the workstation;
   the user selecting a number of print jobs from the received list;
   the printing device transmitting a print job data request signal to the workstation for printing the print job data corresponding to the stored assigned ID information based on the print jobs selected; and
   the workstation transmitting the print job data for the selected print jobs to the printing device in response to the print job data request signal.

2. A method according to claim 1, wherein the system further comprises a second workstation, and the method further comprises the steps of:
   the second workstation generating and storing second print job data for a document;
   the second workstation assigning ID information of the user to the second print job data;
   the second workstation transmitting the assigned ID information to the printing device by multi-casting the assigned ID information to the network;
   the printing device receiving the multi-cast assigned ID information from the second workstation and storing the received assigned ID information;
   the printing device comparing the ID information input by the user with the stored ID information received from the second workstation;
   the printing device transmitting a second authentication signal to the second workstation if the input ID information corresponds to the stored assigned ID information transmitted by the second workstation based on the comparison; and
   the printing device transmitting a second print job data request signal to the second workstation for printing the print job data corresponding to the stored assigned ID information transmitted by the second workstation.

3. A method according to claim 2 further comprising,
   the printing device receiving a list of pending print jobs from each of the workstation and the second workstation, the user selecting a number of print jobs from a compiled list compiled from the received lists,
   wherein the printing device transmits the print job data request signal to one or both of the workstation and the second workstation based on the print jobs selected, and one or both of the workstation and the second workstation transmit print data for the selected print jobs to the printing device.

4. A non-transitory computer readable storage medium on which is stored computer executable code of a computer program which when loaded into a workstation and/or a printing device and executed, performs the method of claim 1.

5. An office installation capable of roaming printing, the installation comprising:
   at least one workstation; and
   at least one printing device, wherein each workstation is connected to each printing device via a network, such that print job data request signals can be transmitted from the printing device(s) to the workstation(s) and print job data can be transmitted from the workstation(s) to the printing device(s), wherein, the installation is arranged such that during a printing operation, (i) a user at one workstation selects, via a printer driver in the one workstation, a roaming print mode for printing a document to an unspecified printer; (ii) the one workstation generates and stores print job data for the document and assigns ID information of a user to the print job data, (iii) the one workstation transmits the assigned ID information to the printing devices by multi-casting the assigned ID information to the network, (iv) the printing devices receive the multi-cast assigned ID information and store the received assigned ID information, (v) the user inputs ID information to one of the printing devices, (vi) the one printing device compares the ID information input by the user with the stored assigned ID information, (vii) the one printing device transmits an authentication signal to the one workstation if the input ID information corresponds to the stored assigned ID information based on the comparison, (viii) the one workstation transmits to the one printing device a list of pending print jobs for which the input ID information is assigned after receiving the authentication signal from the one printing device, (ix) the one printing device receives the list of pending print jobs from the one workstation, (x) the user selects a number of print jobs from the received list, (xi) the one printing device transmits a print job data request signal to the one workstation for printing the print job data corresponding to the stored assigned ID information based on the print jobs selected, and (xii) the one workstation then transmits the print job data for the selected print jobs to the one printing device after it has received the print job data request signal from the one printing device.

6. A workstation for use as part of an office installation capable of roaming printing via a network comprising the workstation and a printing device, the workstation comprising:

a processor and a memory;

a printer driver in which a user selects a roaming print mode for printing a document to an unspecified printer;

a print job data generator that generates print job data for the document to be printed;

a print job data store that stores the generated print job data;

an ID information assignor that assigns ID information of the user to the print job data;

an ID information transmitter that transmits the assigned ID information to the printing device by multi-casting the assigned ID information to the network;

a signal receiver that receives an authentication signal from the printing device, and receives a print job data request signal from the printing device in the office installation for printing the print job data corresponding to the transmitted assigned ID information;

a list transmitter that transmits to the printing device a list of pending print jobs for which the ID information is assigned after receiving the authentication signal from the printing device; and a print job data transmitter that transmits print job data for print jobs selected from the list to the printing device after receiving the print job data request signal, wherein the printing device receives the multi-cast assigned ID information and stores the received assigned ID information, wherein the printing device receives ID information input by the user at the printing device, wherein the printing device compares the input ID information with the stored assigned ID information transmitted by the workstation, wherein the printing device transmits the authentication signal to the workstation if the input ID information corresponds to the stored assigned ID information based on the comparison, wherein the printing device receives the list of pending print jobs from the workstation, and a user selects a number of print jobs from the received list, and wherein the printing device transmits the print job data request signal to the workstation based on the print jobs selected.

7. A workstation as claimed in claim 6, wherein the ID information assignor assigns ID information to the print job data in a form of: (i) a user-specified PIN, (ii) a workstation generated job code, (iii) a username and password of the user or (iv) a user-specified card number.

8. A workstation as claimed in claim 6, wherein the workstation further comprises a print job properties data transmitter to transmit print job properties data to the printing device.

9. A workstation as claimed in claim 6, wherein the workstation further comprises software for managing the print job data store, wherein upon shutting down of the workstation, the software produces a message indicating that print job data stored in the print job data store will be unavailable when the workstation is turned off.

10. A non-transitory computer readable storage medium on which is stored computer executable code of a computer program which when loaded into a workstation and executed, causes the workstation to function as the workstation of claim 6.

* * * * *